United States Patent Office 3,340,321
Patented Sept. 5, 1967

3,340,321
TEMPERATURE CONTROL FOR CATALYST BED IN DEHYDROGENATION PROCESS
Robert G. Craig, Wilmington, Del., assignor to Air Products and Chemicals, Inc., Philadelphia, Pa., a corporation of Delaware
No Drawing. Filed Apr. 7, 1964, Ser. No. 358,084
4 Claims. (Cl. 260—680)

This application is a continuation-in-part of my copending and now abandoned application Ser. No. 843,333, filed Sept. 30, 1959.

This invention relates to the dehydrogenation of hydrocarbons in the presence of particulate contact material comprising catalyst for the production of desirable double-bond products, such as olefins and diolefins, examples of which are butylene, butadiene, etc.

One of the particular difficulties encountered in dehydrogenation reactions carried out within a mass of catalysts particles is the avoidance of localized regions of excessively high temperature within the catalyst mass, generally attributable to increased coking. Furthermore, inasmuch as the dehydrogenation is generally carried out as a continuous cyclic process involving recurring periods of dehydrogenation, purge, and catalyst regeneration, repeated exposure of the catalytic material to such adverse temperature conditions has a cumulative effect in causing rapid deterioration of the chemical and physical properties of the catalyst. Available operating procedures for controlling adverse temperature conditions have the net result of lowering the plant productivity.

Dehydrogenation reactions are commonly carried out as a cyclic adiabatic operation, involving a plurality of reactors operating in timed sequence, in which the heat required for the endothermic hydrocarbon conversion is substantially in balance with the exothermic heat derived from the combustion, during the catalyst regeneration period, of coke formed on the catalyst during the previous reaction period.

In fixed-bed operations, possibly involving a plurality of reactors operating in timed sequence, the catalyst is conveniently in the form of pre-formed granules or pellets of catalytic material, such as chromia-alumina, having an average particle diameter of about 1 to 15, and preferably about 2 to 8 millimeters, and is maintained as a compact bed in the reactor or reactors.

In attempting to maintain adiabatic operation at constant conversion to the desired double-bond product or products, a particular problem arises in connection with temperature control in order to avoid too rapid deterioration of the catalyst. Adversely high temperature conditions generally are caused by excessive coke deposition beyond that required for heat-balanced operation, although it is possible for a temperature imbalance to occur for other reasons, such as temporary failure of temperature control on the hydrocarbon feed to the reactor or on the air feed line during regeneration.

Some of the possible causes of increased coke production likely to produce such adverse temperatures in the reactor are (1) low space rate, or reduction in total feed, space rate being defined as the liquid volume of total feed per unit time per volume of particulate catalyst (excluding inerts); (2) poor operation of the product recovery unit with an increase in unsaturation for the material being recycled to the reactors during the conversion stage as, for example, an increase in the diolefin content of the recycle material; (3) above-normal pressures in the reactor, for example, by reason of inefficient operation of the compression section; (4) changes in feed composition toward higher proportion of unsaturates; (5) increased unsaturation in product per pass; and (6) change of catalyst or catalyst deterioration with use.

Expanding on the last-mentioned cause, reactor has been in operation for a long period of time and the catalyst has become well aged, the unit, for any of the foregoing or other reasons, may have a tendency to get out of heat balance, thereby making it increasingly difficult to control catalyst bed temperatures. This is generally attributable to an increase in the coke level, which is a major contributing factor in the development of so-called "hot spots" in the bed. While such hot spots may also, at least in part, result from a maldistribution of either catalyst, oil or air, their presence, for whatever reasons, becomes more serious at high coke levels.

Thus, high coking creates a serious problem in the matter of heat control, since the effect is cumulative. Any hot spots which might be present or develop during successive cycles will cause increased coke formation in such hotter regions of the bed. When the malfunctioning reactor is in the subsequent regeneration stage, the burning of the locally deposited excess coke causes the temperatures in such regions of the bed to rise above the temperatures in the surrounding regions, causing an adverse temperature profile which becomes progressively worse with repeated cycles of operation. The operating adjustments which are commonly resorted to in an attempt to overcome the effects of such condition and to stay in heat balance, such as lowering the reaction temperatures, generally have the net result of decreasing plant productivity. In some cases there may also be a more rapid deterioration of the catalyst, necessitating a premature shutdown.

The foregoing problem in dehydrogenation processes has been well recognized in the petroleum refining art, and various methods have been proposed for controlling or equalizing bed temperatures. In some instances of commercial operation, a comparatively long "air blow" has been employed during the regeneration cycle in order to equalize the temperature of the bed. For various reasons, however, it is better to eliminate the necessity for prolonged "air blow" by exercising some control on the conditions which ultimately necessitate such operation.

Material balances developed from the operation of commercial dehydrogenation plants show an excess of hydrogen of as much as 0.25 wt. percent of total feed over that present in the initial feed. This phenomenon has been attributed to a water-gas reaction occurring during the usual steam purge. Furthermore, analyses of the reactor effluent of a commercial dehydrogenation unit during the purge period have shown high concentrations of carbon monoxide, despite the fact that reactor temperatures are somewhat lower than those normally associated with water-gas reactions. The presence of excess hydrogen and carbon monoxide indicate the presence of at least some partial coke-steam reaction when steam is introduced into the reactor during the purging period.

In accordance with the invention, a cyclic, catalytic dehydrogenation process adapted for generally heat-balanced operation and tending toward a state of heat imbalance for reasons including an excess accumulation of coke during successive conversion stages, is restored to substantial heat-balanced operation by providing a controlled endothermic coke-steam reaction sufficient to remove the excess amount of coke during the period for purging the gaseous conversion products from the bed with a gaseous purging medium immediately preceding the regeneration stage. The purging medium may be any gaseous material known to be suitable for purging of hydrocarbon conversion products. For most practical purposes, however, the purging medium will comprise steam.

The steam employed for the desired coke-steam reaction is designated reactant steam in that it is introduced for the specific purpose of reacting with the excess coke. It is independent of and distinguished from any other amount of steam which also may be present during the purging period, as where the selected purging medium comprises steam.

Thus, the coke-steam reaction for the specific purpose of extracting heat and removing coke from the bed may be considered as distinct from any additional coke-steam reactant which might occur during the same total purge period, as where steam is used as the gaseous purging medium. Any such other coke-steam reaction is anticipated and allowed for initially setting the design for heat-balanced operation. In fact, the excess coke formation is established after consideration of any possible coke-steam reaction which occurs as a result of the normal purging operation.

The reactant steam may be introduced during the period initially in the time-cycle sequence for purging the bed, or it may be introduced during a separate period comprising an extension of the normal purge period. Where a gaseous purge medium other than steam is employed, the reactant steam required for the coke-steam reaction may be substituted for a portion of the normal supply of such other gaseous material, in which case it may not be necessary to extend the purging period, provided the total gaseous material is sufficient to effect the desired purging.

Where steam is employed as the normal purging medium, the reactant steam will be in addition to such normal supply of purge steam. While the total supply of steam for coke-steam reaction and purge purposes may in some cases be introduced without increasing the length of the normal purge period, as by increased throughput of steam, for most practical purposes the reactant steam will be introduced during a period comprising an extension of the normal steam purge period. It is common practice to design dehydrogenation processes with sufficient flexibility between automatic and manual operation, that any temporary adjustment of the time cycle may readily be affected without too greatly disturbing the cyclic operation. However, for more extended use a change in the cycle sequence timing may be made with the equipment normally provided.

It is contemplated, however, that where the calculated coke production is just enough to maintain adiabatic operation there will be no need for the introduction of reactant steam to produce a coke-steam reaction. Or, in a case where the charge throughput for the particular size bed is increased to the point where the coke production is insufficient to maintain a heat balance, it is possible that the amount of gaseous purging medium may be cut back, or even eliminated, so that some residual hydrocarbon material may remain in the bed and be utilized as fuel to provide additional heat during the regeneration cycle.

The following data, which is specific to the dehydrogenation of a fresh normal butane feed to produce butenes and butadiene, illustrates the coke requirements for a heat-balanced operation in the production of double-bond compounds, the figures given are expressed as total double-bond production, which is equivalent to the mono-olefin product plus twice the diolefin product.

TABLE I

| Double-bond production, (wt. percent on feed) | Coke production, (wt. percent on feed) |
|---|---|
| 20 | 1.35 |
| 30 | 2.05 |
| 40 | 2.7 |
| 50 | 3.4 |
| 60 | 4.1 |
| 70 | 4.8 |
| 80 | 5.5 |

Table I is equivalent to stating that 0.068 pound of coke are required for each pound of double bond production, the figure for coke requirement being obtained by dividing the weight percent of coke production by the weight percent of double-bond production.

The above figures for coke production include any coke equivalent, such as that provided by the heat of reduction in the usual reduction step preceding the conversion period and by any nominal steam-coke reaction resulting from the minimum steam purge.

Thus, for any desired level of double-bond production, it is possible to closely approximate the amount of coke which will be needed to maintain a condition of heat balance. Under such conditions of approximate heat balance the average inlet and outlet temperatures of the reactor during the conversion stage or, more accurately, the average temperatures at the top and bottom of the bed, will be substantially equal.

The amount of coke required to be deposited on the catalyst during the conversion stage in order that the heat obtained by its subsequent combustion will maintain the unit in substantial heat balance is readily calculated by the equation $$C = \frac{\text{Wt. percent Butadiene in product}}{16} \times 1.28$$

where $C$ = wt. percent of coke based on total feed and the butadiene in the product is in the range of 0–16 wt. percent of total feed.

For the dehydrogenation of a high butylene content fresh feed (65 wt. percent double-bond $n\text{-}C_4$, 35 wt. percent $n\text{-}C_4$), the butadiene vs. coke relationships for two different space rates designated A and B, have been determined, and are expressed in the following Table II, the data being given in wt. percent based on initial feed.

TABLE II

| | Butadiene Produced | Coke Produced | Coke Needed for Heat Bal. | Excess Coke Produced |
|---|---|---|---|---|
| A | 4 | 0.2 | 0.3 | −0.1 |
| | 6 | 0.3 | 0.5 | −0.2 |
| | 10 | 0.6 | 0.8 | −0.2 |
| | 14 | 1.1 | 1.1 | 0 |
| | 16 | 1.5 | 1.3 | +0.2 |
| B | 4 | 0.3 | 0.3 | 0 |
| | 6 | 0.5 | 0.5 | 0 |
| | 10 | 1.0 | 0.8 | +0.2 |
| | 14 | 1.4 | 1.1 | +0.3 |
| | 16 | 2.2 | 1.3 | +0.9 |

Mathematically, the foregoing relationships can be expressed by the following equations Space Rate A $\quad y = \dfrac{x(0.878-x)}{0.033+3.13x}$ Space rate B $\quad y = \dfrac{x(0.878-x)}{0.057+2.80x}$ where the wt. percent butadiene production is expressed as ($y$ times 100) and the wt. percent coke production is expressed as ($x$ times 100).

It may be seen from the foregoing data that for the same butadiene production the two space rates differ in their coke producing characteristics, space rate A producing approximately 0.6 as much coke as space rate B. Similar relationships are easily determined for other charge stocks, such as a normal butane fresh feed.

For a particular dehydrogenation operation, the amount of reactant steam which is needed to remove from the catalyst the amount of coke which is in excess of that required to maintain a substantially balanced operation is readily calculated. If the actual coke production is determined, as by measured temperature changes in the reactor bed or by analysis of the regeneration gases, then the reactant steam requirement ($S$) in lbs./hr. for the coke-steam reaction may be calculated by the equation:

$$S = \frac{C_t - C_r}{100} \times HC \times \frac{18}{12+y}$$

Where

S = Reactant steam (lbs./hr.)
$C_f$ = Coke actually formed (wt. percent of feed)
$C_r$ = Coke required for heat-balanced operation (wt. percent of feed)
HC = Hydrocarbon feed (lbs./hr.)

$\frac{18}{12+y}$ = the ratio of the molecular weights of water to coke, $y$ being the number of atoms of hydrogen in coke of the formula $(CH_y)_z$ It is to be understood that in any given situation the minimum total purge gas requirement will be that which will assure a safe operation.

The following data exemplifies a typical commercial operation on charge stock comprising a butane-butene mixture, with small amounts of isobutane, isobutene and butadiene, and employing steam as the gaseous purging medium.

Example I

| | |
|---|---|
| Feed rate, lbs./hr. | 133,900 |
| Total butylene in feed, lbs./hr. | 31,890 |
| Net butylene product | 13,090 |
| Net butadiene product | 9,410 |
| Heat required, B.t.u./hr.: | |
|   Heat of hydrocarbon reaction | 30,976,000 |
|   Heating of purge steam | 480,000 |
|     Sub-total | 31,456,000 |
| Heat supplied, B.t.u./hr.: | |
|   Air cooling | 4,860,000 |
|   Catalyst reduction (max.) | 10,350,000 |
|     Sub-total | 15,210,000 |

The net heat required from coke combustion, neglecting the coke-steam reaction, is the difference between the heat required and the heat supplied, or 16,246,000 B.t.u./hr. Insofar as the unit may be operated to produce coke in an amount just sufficient to supply the 16,246,000 B.t.u./hr., substantial heat balance may be attained. It is when the unit, for any of the reasons stated, starts to produce coke in excess of such requirement that a problem with respect to maintaining the heat balance begins to develop. At such time, the method of the present invention may be employed to prevent excessive coke accumulation, and resultant progressive temperature rise, by consuming the excess amount of coke in an endothermic coke-steam reaction preceding the regeneration step. By controlling the amount of reactant steam the endothermic reactions $$C + H_2O \rightarrow CO + H_2$$

$$C + 2H_2O \rightarrow CO_2 + 2H_2$$

may be controlled.

It is to be understood that the endothermic reactions occurring during this period of steam treatment are not necessarily limited to oxidation of coke as such. It is possible that small amounts of residual butane or hydrocarbon polymers not yet reduced to coke may be present during the steam treatment, and will be converted in other endothermic reactions, of which the following are typical, $$C_4H_{10} + 4H_2O \rightarrow 4CO + 9H_2$$

$$C_8H_{16} + 8H_2O \rightarrow 8CO + 16H_2$$

Since there is not likely to be a considerable quantity of such hydrocarbons unremoved by the gaseous purging medium in the initial stages of the purging step, and since their effect is the same as that of the actual deposited coke, in that they react endothermically with the reactant steam and, if not removed, subsequently react exothermically along with the coke during the regeneration step, they may for practical purposes be considered as part of the coke.

While the method of the invention is effective to control temperatures sufficiently to maintain a condition of substantial heat balance by removing appreciable quantities of heat as well as the excess coke from the catalyst mass, such heat removal does not necessarily produce a marked lowering of bed temperature. In fact, it may be difficult to detect any significant change in the temperature of the catalyst mass by the temperature-indicating means normally employed.

The heat removal capabilities of the method are evident, however, from the following data representing a typical commercial dehydrogenation operation using a steam purge.

Example II

| | |
|---|---|
| Steam equivalent of coke removed by coke-steam reaction, lbs./hr. | 600 |
| Total hydrocarbon feed rate, lbs./hr. | 100,000 |
| Heat of reaction, B.t.u./lb. mol | 59,750 |
| Total heat of reaction, B.t.u./hr. | 1,990,000 |
| Number of reactors | 5 |
| Cycle length, minutes | 20 |
| Steam purges per hour | 15 |
| Catalyst per reactor, lbs. | 50,000 |
| Inert per reactor, lbs. | 163,000 |
| Heat capacity of catalyst and inert, B.t.u./lb./° F. | 0.25 |
| Heat content of bed (213,000) (0.25, B.t.u./° F. | 53,200 |
| Heat absorbed per purge, B.t.u., 1,990,000/15 | 131,000 |
| Change in bed temperature per purge, ° F., 131,000/53,200 | 2.5 |
| Pounds of carbon removed (600/18) (12)[1], lbs./hr. | 400 |
| Heat of combustion of carbon removed (400) (17,500 B.t.u./lb.), B.t.u./hr. | 7,000,000 |
| Total heat removed from catalyst beds by coke-steam reaction, B.t.u./hr. | 8,990,000 |

[1] For simplicity, the value of $y$ in the molecular formula for coke is assumed to be zero.

Although the 2.5° F. temperature drop in the bed would not ordinarily be detected, the removal of nine million B.t.u./hr. has a substantial effect on the heat balance of the process.

This invention provides several distinct process advantages not obtained by dehydrogenation processes in present use. In addition to the advantage of removing heat and coke from the system by the endothermic reaction between the excess coke and a controlled amount of reaction steam introduced for such purpose, there is some economic advantage in obtaining additional valuable fuel product in the effluent of the product purge step instead of burning off the excess coke in the regeneration step and passing the effluent of combustion of the excess coke out through the stack with the main combustion products.

A possible additional advantage of the process is that it is possible to design a dehydrogenation unit for somewhat greater coke production than is needed to maintain substantial heat balance, and to remove the excess coke by a controlled coke-steam reaction.

While the invention has been described in connection with a process employing steam as the gaseous purging medium, so that reactant steam introduction for the purpose of carrying out a coke-steam reaction has involved merely the continuation of steam introduction beyond the normal requirement for steam purging, it is to be understood that any suitable inert gaseous medium may be employed for purging.

Generally, steam is the most readily available and economical purging medium, but it is conceivable that in a large refinery installation there may be a choice between steam and some other inert gaseous material which may be readily available and in sufficient supply for purging purposes. For example, inert flue gas obtained from the combustion of coke deposits on granular contact material, inert gas generated by the combustion of fuel, or inert elemental gas, such as nitrogen, may be employed. The reactant steam for the coke-steam reaction would then be in addition to the inert gas and may be introduced within the total purge period, either separately or along with the inert purging medium.

Obviously many modifications and variations of the invention as hereinbefore set forth may be made without departing from the spirit and scope thereof, and therefore only such limitations should be imposed as are indicated in the appended claims.

What is claimed is:

1. In a cyclic adiabatic process for dehydrogenating hydrocarbons in the presence of a mass of particulate catalyst for production of desirable double-bond products, including successive stages of hydrocarbon conversion, purge of gaseous conversion products with an inert gaseous medium, catalyst regeneration by combustion of coke formed thereon during said conversion, and purge of gaseous combustion products; in which process, continuance of desired adiabatic operation requires that a substantial balance be maintained between the heat needed for the endothermic hydrocarbon conversion and the heat derived from the exothermic combustion of said coke, the coke requirement is 0.068 times the summation of the weight percent of each desired hydrocarbon component multiplied by the number of carbon-to-carbon double-bonds in such component, and there is a present heat imbalance resulting from an increase in the coke-to-conversion ratio; the method for restoring the process to substantial heat-balanced operation which comprises the steps of: determining the amount of coke formation on the catalyst in excess of the amount required to maintain the desired heat balance for the particular conversion being effected, and introducing a controlled amount of reactant steam into said catalyst mass while purging said gaseous conversion products therefrom to effect an endothermic coke-steam reaction with said excess amount of coke, said reactant steam being supplied in accordance with the equation $$S = \frac{C_f - C_r}{100} \times HC \times \frac{18}{12+y}$$

where $S$ = Reactant steam (lbs./hr.)
$C_f$ = Coke actually formed (wt. percent of feed)
$C_r$ = Coke required for heat-balanced operation (wt. percent of feed)
$HC$ = Hydrocarbon feed (lbs./hr.)

$\frac{18}{12+y}$ = the ratio of the molecular weights of water to coke, $y$ being the number of atoms of hydrogen in coke of the formula $(CH_y)_z$ and $z$ being any whole number.

2. The method of claim 1 in which said reactant steam (S) is the only steam present during said purge of gaseous conversion products and comprises only a portion of the total insert gaseous purge medium.

3. The method of claim 1 in which said inert gaseous purge medium is steam and the amount of reactant steam (S) is additional to the amount of steam supplied for purging.

4. The method of claim 3 in which said amount of reactant steam (S) is introduced into said mass during a prolongation of the regular purge period.

References Cited

UNITED STATES PATENTS

| | | | |
|---|---|---|---|
| 2,831,041 | 4/1958 | Sieg et al. | 260—680 |
| 2,924,632 | 2/1960 | Baumann | 260—680 |

PAUL M. COUGHLAN, JR., *Primary Examiner.*

ALPHONSO D. SULLIVAN, *Examiner.*